(12) United States Patent
Megherhi et al.

(10) Patent No.: US 7,230,817 B2
(45) Date of Patent: Jun. 12, 2007

(54) Y5V DIELECTRIC COMPOSITION

(75) Inventors: Mohammed H. Megherhi, Victor, NY (US); Mike S. H. Chu, Lewiston, NY (US); Daniel E. McCauley, Watkins Glen, NY (US); Elizabeth W. Römer, LD Uden (NL); Willibrordus J. Coppens, WL Uden (NL); Knuth Albertsen, Goch (NL)

(73) Assignee: Ferro Corporation, Cleveland, OH (US)

( * ) Notice: Subject to any disclaimer, the term of this patent is extended or adjusted under 35 U.S.C. 154(b) by 239 days.

(21) Appl. No.: 11/107,358

(22) Filed: Apr. 15, 2005

(65) Prior Publication Data

US 2006/0232910 A1    Oct. 19, 2006

(51) Int. Cl.
*H01G 4/06* (2006.01)
*C04B 35/468* (2006.01)

(52) U.S. Cl. .............................. 361/321.4; 361/321.5; 501/138; 501/139

(58) Field of Classification Search ............. 361/321.4, 361/321.5; 501/138, 139
See application file for complete search history.

(56) References Cited

U.S. PATENT DOCUMENTS

| | | | |
|---|---|---|---|
| 4,558,020 A | 12/1985 | Itakura et al. | |
| 4,855,266 A | 8/1989 | Burn | |
| 5,070,047 A | 12/1991 | Gardner et al. | |
| 5,071,794 A | 12/1991 | Shaikh | |
| 5,097,391 A | 3/1992 | Nomura et al. | |
| 5,120,579 A | 6/1992 | Gardner et al. | |
| 5,128,289 A | 7/1992 | Wilson | |
| 5,164,342 A | 11/1992 | Muralidhar et al. | |
| 5,258,335 A | 11/1993 | Muralidhar et al. | |
| 5,296,425 A | 3/1994 | Chazano et al. | |
| 5,361,187 A | 11/1994 | Srinivasan | |
| 5,397,830 A | 3/1995 | Shaikh et al. | |
| 5,510,305 A | 4/1996 | Sano et al. | |
| 5,571,767 A | 11/1996 | Wilson et al. | |
| 5,599,757 A | 2/1997 | Wilson et al. | |
| 5,604,167 A | 2/1997 | Wilson et al. | |
| 5,790,367 A | 8/1998 | Mateika et al. | |
| 5,841,625 A | 11/1998 | Hennings et al. | |
| 5,900,223 A | 5/1999 | Matijevic et al. | |
| 6,072,688 A | 6/2000 | Hennings et al. | |
| 6,078,494 A | 6/2000 | Hansen | |
| 6,185,087 B1 | 2/2001 | Park et al. | |
| 6,610,241 B2 | 8/2003 | Shrout et al. | |
| 6,649,554 B1 | 11/2003 | Chang et al. | |
| 6,721,164 B1 | 4/2004 | Albertsen et al. | |
| 6,727,200 B2 | 4/2004 | Maher et al. | |
| 6,797,661 B2 | 9/2004 | Mikkenie et al. | |
| 6,828,266 B1 | 12/2004 | Park et al. | |
| 7,161,795 B1 * | 1/2007 | Megherhi et al. ........ 361/321.5 |

* cited by examiner

*Primary Examiner*—Karl Group
(74) *Attorney, Agent, or Firm*—Rankin, Hill, Porter & Clark LLP (57) ABSTRACT

Multilayer ceramic chip capacitors which satisfy Y5V requirements and which are compatible with reducing atmosphere sintering conditions so that non-noble metals such as nickel, copper, and alloys thereof may be used for internal and external electrodes are made in accordance with the invention. The capacitors exhibit desirable dielectric properties (high capacitance, low dissipation factor, high insulation resistance), excellent performance on highly accelerated life testing, and very good resistance to dielectric breakdown. The dielectric layers comprise $BaTiO_3$ doped with other metal oxides such as $MgO$, $CaO$, $ZnO$, $MnO_2$, $ZrO_2$, $SiO_2$, $Nd_2O_3$, $Nb_2O_5$, and $Y_2O_3$.

20 Claims, 5 Drawing Sheets

Y5V DIELECTRIC COMPOSITION

BACKGROUND OF THE INVENTION

1. Field of Invention

This invention relates to a barium titanate-based dielectric composition, and more particularly to a barium titanate-based dielectric composition that can be used to form multilayer ceramic chip capacitors having internal base metal electrodes formed of nickel or nickel alloys.

2. Background of the Invention

Multilayer ceramic chip capacitors have been widely utilized as miniature-sized, high capacitance, and high reliability electronic components. In accordance with increasing demands for high-performance electronic equipment, multilayer ceramic chip capacitors also have encountered marketplace demand for smaller size, higher capacitance, lower cost, and higher reliability.

Multilayer ceramic chip capacitors generally are fabricated by forming alternating layers of an internal electrode forming paste and a dielectric layer-forming paste. Such layers are typically formed by sheeting, printing, or similar techniques, followed by concurrent firing.

Generally, the internal electrodes have been formed of conductors such as palladium and palladium alloys. Although palladium is expensive, it can be partially replaced by the use of relatively inexpensive base metals such as nickel and its alloys. A "base metal" is any metal other than gold, silver, palladium, and platinum. Base metal internal electrodes can become oxidized if fired in ambient air, so the dielectric layers and internal electrode layers must be co-fired in a reducing atmosphere. Firing in a reducing atmosphere, however, causes the dielectric layers to be reduced, which decreases resistivity. Multilayer ceramic chip capacitors using non-reducible dielectric materials have been proposed, however, such devices typically have a shorter life of insulation resistance (IR) and low reliability.

When the dielectric material is subject to a DC electric field, its relative dielectric constant (K) decreases with time. If thinner dielectric layers are used in order to provide chip capacitors of a smaller size and greater capacitance, application of DC voltages across the capacitor causes the dielectric layers to receive a more intense electric field, resulting in a greater change of dielectric constant with time, that is, a greater change of capacitance with time. Such changes are undesirable in most applications.

The Electronic Industry Association (EIA) prescribes a standard for the temperature coefficient of capacitance (TCC) known as the Y5V characteristic. The Y5V characteristic requires that the change of capacitance be within +22% and −82% of its value at the reference temperature, 25° C., over the temperature range −30° C. to 85° C.

SUMMARY OF THE INVENTION

The present invention provides a dielectric composition that can be used to make ceramic multilayer capacitors compatible with internal electrodes containing base metals such as nickel or nickel alloys. Capacitors may be formed from the dielectric composition of the present invention to exhibit a high dielectric constant with a small dielectric loss and excellent reliability under highly accelerated life testing conditions. Additionally, the capacitors can have dielectric layers of less than three microns, while exhibiting a low aging rate and superior temperature characteristics that meet the Y5V standard.

The dielectric composition of the present invention comprises a uniform dense microstructure of grains having an average diameter of about 3–4 microns. A uniform and dense grain microstructure is critical in achieving high reliability multilayer capacitors having dielectric layers thinner than 5 microns.

The dielectric composition of the present invention comprises, prior to firing, a blend of barium titanate, and the oxides of magnesium, calcium, zinc, manganese, zirconium, silicon, neodymium, niobium and yttrium. As will be set forth hereinbelow, the composition can also be made by firing a blend of one or more of the aforementioned oxides with pre-reacted $BaTiO_3$. Another route is to begin with $BaCO_3$ (or BaO) and $TiO_2$ instead of pre-reacted $BaTiO_3$ in order to achieve the final desired proportion of $BaTiO_3$ in the dielectric composition.

As shown in the Examples hereinbelow, dielectric compositions of the invention can also be made by pre-reacting several minor ingredients to form precursors first as long as the final chemistry of the compositions is within the desired range. For example, BaO, ZnO, and $Nb_2O_5$ can be pre-reacted to form $Ba(Zn_{1/3}Nb_{2/3})O_3$. Additionally, CaO and $ZrO_2$ can be pre-reacted to form $CaZrO_3$, or BaO and $ZrO_2$ can be reacted to form $BaZrO_3$. It will be appreciated, that a desired composition may be obtained through more than one route.

Multilayer chip capacitors are fabricated by alternately stacking dielectric layers and internal electrodes to form green chips. The internal electrodes of interest herein are comprised of base metals including nickel or nickel alloys. The dielectric composition that forms the dielectric layers is produced by wet milling the components of the dielectric with an organic vehicle system. The dielectric composition is deposited on a carrier film, such as polyester, polypropylene, or a belt, such as stainless steel, paper, or a substrate such as alumina, or glass, coating the film and forming sheets, which are alternately stacked with electrodes to form the green chips.

After the green chips are formed, the organic vehicle is removed by heating to a temperature less than 300° C. in an air atmosphere. Once the vehicle is removed, the green chips are then fired in a reducing atmosphere of wet nitrogen and hydrogen having an oxygen partial pressure of about $10^{-8}$ to about $10^{-12}$ atm, at a temperature of about 1100° C. to about 1400° C. The green chips are then re-oxidized in an atmosphere having an oxygen content in the range of about $6 \times 10^{-6}$ to about $6 \times 10^{-5}$ atm at a temperature of about 900° C. to about 1100° C. to enhance insulation resistance and reliability of the dielectric.

It has been found that the multilayer ceramic capacitors of the present invention exhibit a very high dielectric constant and perform well in highly accelerated life testing conditions, and also exhibit a high breakdown voltage in a DC field. Under the highly stressed conditions consisting of an applied DC field of 15 volts/micron and 140° C., the ceramic capacitors demonstrate a characteristic life up to 100 hours.

The dielectric constant is greater than 14,000 and the dissipation factor is less than 10.0% at 25° C. when measured at 1 volt root mean square (RMS). The temperature coefficient of capacitance is within +22% and −82% of the value at the reference temperature, 25° C., over the temperature range of −30° C. to +85° C.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
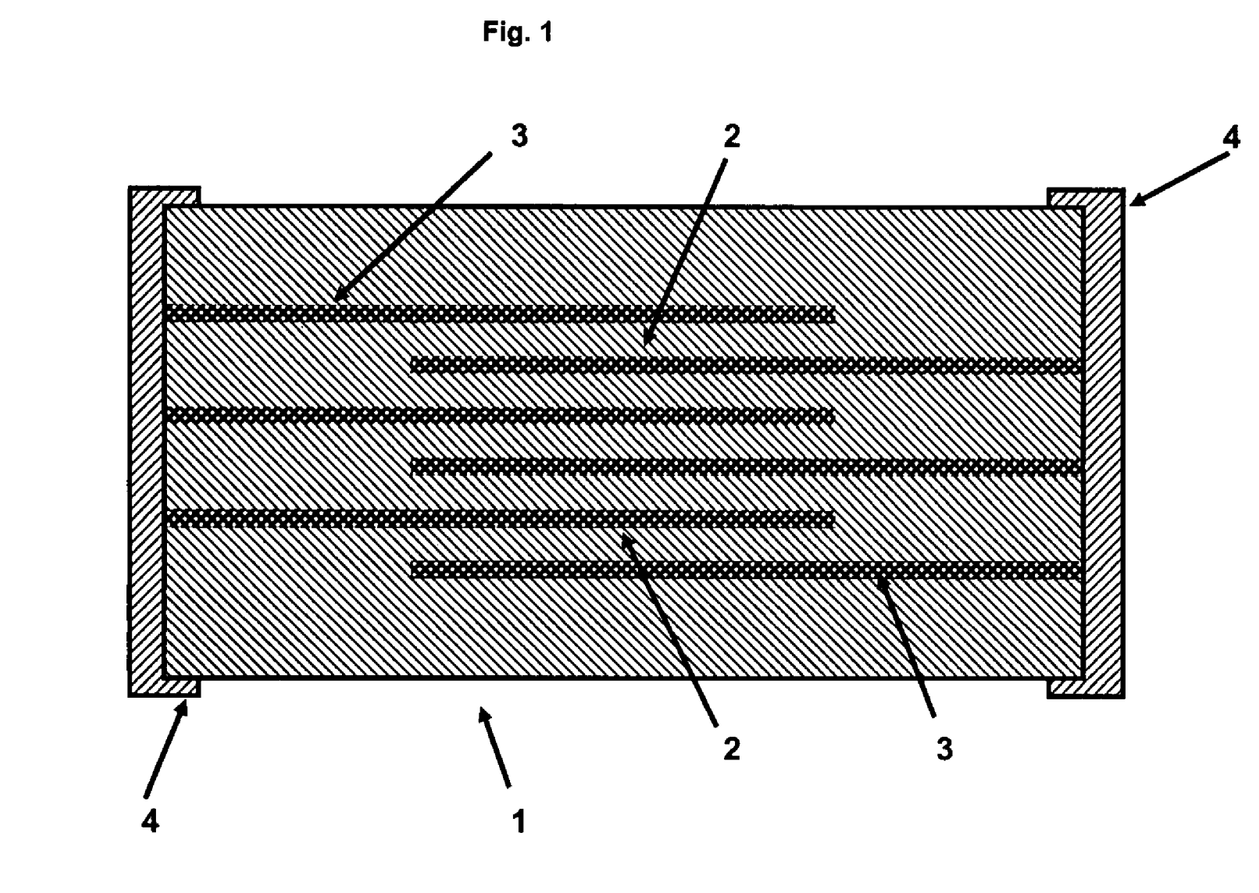
FIG. 1 is a cross-sectional view of a multilayer ceramic chip capacitor according to an embodiment of the invention.

The configuration of multilayer ceramic capacitors is well known in the art. With reference to FIG. 1, an exemplary structure of a multilayer ceramic chip capacitor 1 is shown. External electrodes 4 of the capacitor 1 are disposed on side surfaces of the capacitor chip 1 and in electrical connection with internal electrode layers 3. The capacitor chip 1 has a plurality of alternately stacked dielectric layers 2. The shape of the capacitor chip 1 is not critical although it is often rectangular shaped. Also, the size is not critical and the chip may have appropriate dimensions in accordance with a particular application, typically in the range of 1.0 to 5.6 mm×0.5 to 5.0 mm×0.5 to 1.9 mm. The internal electrode layers 3 are stacked such that at opposite ends they are alternately exposed at opposite side surfaces of the chip 1. That is, the internal electrode layers 3 of one group are exposed at one side surface of the chip 1 and the internal electrode layers 3 of another group are exposed at the opposite side surface of the chip 1. One external electrode 4 is applied to one side surface of the capacitor chip 1 in electrical contact with the internal electrode layers 3 of the one group, and the other external electrode 4 is applied to the opposite side surface of the chip 1 in electrical contact with the internal electrode layers 3 of the other group.

The dielectric layers are formed of a dielectric material formed by sintering a blend including barium titanate as a major component and oxides of magnesium, calcium, zinc, manganese, zirconium, silicon, neodymium, niobium, and yttrium oxide as minor components. Broadly, the composition may be formed by blending and sintering about 52–70 weight percent (wt %) of BaO, about 24–53 wt % $TiO_2$, and about 2–12 wt % $ZrO_2$ and lesser amounts of other oxides as provided in Table 1 below. In a preferred embodiment, the composition comprises about 58–67 wt % BaO and about 28–31 wt % $TiO_2$ ("intermediate" formula in Table 1). More preferably, the composition comprises about 58–64 wt % BaO and about 29–30 wt % $TiO_2$ (narrow formula in Table 1).

TABLE 1

Oxide formulations of dielectric compositions.

| Ingredient | Broad | Intermediate | Narrow |
|---|---|---|---|
| | weight percent | | |
| BaO | 52.31–69.14 | 57.54–66.99 | 58.20–64.17 |
| $TiO_2$ | 24.67–32.82 | 28.44–31.48 | 28.79–30.29 |
| MgO | 0.02–1.50 | 0.06–0.12 | 0.07–0.10 |
| CaO | 0.01–1.50 | 0.01–0.07 | 0.02–0.05 |
| ZnO | 0.00–1.50 | 0.01–0.80 | 0.1–0.5 |
| $MnO_2$ | 0.02–1.50 | 0.1–0.7 | 0.2–0.5 |
| $ZrO_2$ | 2–12 | 3–8 | 4–7 |
| $SiO_2$ | 0.01–2.50 | 0.01–0.10 | 0.02–0.08 |
| $Nd_2O_3$ | 0.02–2.50 | 0.2–0.8 | 0.3–0.7 |
| $Nb_2O_5$ | 0.02–2.50 | 0.04–0.12 | 0.05–0.10 |
| $Y_2O_3$ | 0.02–2.50 | 0.20–1.00 | 0.4–0.7 |

As will be understood by those skilled in the art, precursors of the oxides such as carbonates, oxalates, acetates, nitrates, hydroxides, and organometallic compounds such as metal formates, oxalates, etc., have the same effect, so long as the desired metal ion (Mg, Ca, etc) is provided in the desired quantity.

Preferably, the $SiO_2$, and portions of CaO and BaO present in the dielectric composition are provided in the form of pre-melted glass frit, which improves insulation resistance and plating resistance as well as densification of the dielectric. The oxidation state of each oxide is not critical as long as the metal elements constituting the respective oxides are present within the above-identified ranges. Other compounds may be present in the dielectric material provided that the other compound does not adversely affect dielectric properties. Such compounds are usually found in the raw materials as impurities.

The dielectric composition may be considered to be a $BaTiO_3$ matrix doped with minor amounts of metals such as Mg, Ca, Zn, Mn, Zr, Mg, Si, Nb, Nd and Y. The desired effects provided by each of these metals, plus the effect on the composition of a paucity or excess thereof, are set forth in Table 2.

TABLE 2

Effect of various additives on dielectric properties.

| Ingredient | effect if too low | desired effect | effect if too high |
|---|---|---|---|
| BaO + $TiO_2$ | Low K | None (baseline material) | Poor sintering, Poor densification |
| MgO | Grains too large | Reduces grain size | Low K |
| CaO | No help sintering | Enhances sintering | Impedes sintering |
| ZnO | Not critical | Improves sintering & reliability | Low K, low $T_{Curie}$ |
| $MnO_2$ | No effect on IR | Improves IR | Low K |

TABLE 2-continued

Effect of various additives on dielectric properties.

| Ingredient | effect if too low | desired effect | effect if too high |
|---|---|---|---|
| $ZrO_2$ | $T_{Curie} > 25°$ C., low K, high DF | High K, TCC within Y5V | Low $T_{Curie}$, high TCC, grain size too large |
| $SiO_2$ | No effect on sintering | enhances sintering | Low K, poor IR |
| $Nd_2O_5$ | No effect on grain size | Reduces grain size | Low K |
| $Y_2O_3$ | No improved reliability | Improves reliability | Impedes sintering, low K |
| $Nb_2O_5$ | $T_{Curie}$ too high, low K, high DF | $T_{Curie}$ to 10–25° C. | $T_{Curie}$ too low, low K, Ceramic becomes semiconducting |

As used in Table 2, above, the phrases "too low" and "too high" mean, respectively, below the lower limit for the given ingredient and above the upper limit for the given ingredient as set forth in the "broad" ranges in Table 1, above.

The dielectric compositions herein possess fine crystal grains that typically have a mean size of about 3 to about 4 μm, with a grain size of about 3 μm being preferred. The dielectric layers have an appropriate Curie temperature, determined in accordance with the applicable standards by selecting a suitable composition of dielectric material. Typically the Curie temperature is between 10° C. and 25° C., preferably about 10° C. to about 15° C.

Each dielectric layer has a thickness of up to about 50 microns. Preferably, the thickness of each dielectric layer is from about 0.5 microns to about 50 microns. More preferably, the thickness of each dielectric layer is from about 2 microns to about 10 microns. The compositions herein may be employed to make multilayer ceramic chip capacitors having thin dielectric layers to ensure minimal degradation of capacitance over the service life. The number of dielectric layers stacked in a chip capacitor is generally from about 2 to about 800, and more preferably from about 3 to about 400.

Internal Electrode. With reference to FIG. 1, the conductor that forms the internal electrode layers 3 is not critical, although a base metal preferably is used since the dielectric material of the dielectric layers 2 has anti-reducing properties. Typical base metals are nickel and its alloys. Preferred nickel alloys contain at least one other metal selected from Mn, Cr, Co, Cu, and Al. Alloys containing at least about 95 wt % of nickel are preferred. It is to be noted that nickel and nickel alloys may contain up to about 0.1 wt % of phosphorous and other trace components. The thickness of the internal electrode layers may be determined to suit a particular application, but the layers are typically up to about 5 microns thick. Preferably, an internal electrode layer has a thickness of about 0.5 to about 5 microns and more preferably about 1 to about 5 microns.

External Electrode. The conductor that forms the external electrodes 4 is not critical, although inexpensive metals such as nickel, copper, and alloys thereof, optionally containing Mn, Cr, Co, Cu or Al, are preferred. The thickness of the external electrode layers may be determined to suit a particular application, but the layers are typically up about 10 to about 50 microns thick, preferably about 20 to about 40 microns thick.

The multilayer ceramic chip capacitor of the present invention generally is fabricated by forming a green chip by conventional printing and sheeting methods using pastes, and firing the chip. After firing, the chip is tumbled dry in a medium such as alumina or silica to round off corners, a conductive paste, containing copper, for example, is then applied to both ends to connect the exposed inner electrodes together to make terminations. The chip is then termination fired at about 800° C. in a nitrogen atmosphere to sinter the conductor (e.g., copper) into a solid conduction pad at both ends, to form a multilayer capacitor. The terminations are external electrodes 4 as shown in FIG. 1.

Pastes. A paste for forming the dielectric layers can be obtained by mixing an organic vehicle with a raw dielectric material, as disclosed herein. Also useful are precursor compounds that convert to such oxides and composite oxides upon firing, as stated hereinabove. The dielectric material is obtained by selecting compounds containing these oxides, or precursors of these oxides, and mixing them in the appropriate proportions. The proportion of such compounds in the raw dielectric material is determined such that after firing, the desired dielectric layer composition may be obtained. The raw dielectric material is generally used in powder form having a mean particle size of about 0.1 to about 3 μm, and more preferably about 1 μm or less.

A paste for forming internal electrode layers is obtained by mixing an electro-conductive material with an organic vehicle. The conductive material used herein includes conductors such as conductive metals and alloys as mentioned above and various compounds which convert into such conductors upon firing, for example, oxides, organometallic compounds and resinates. An example of a suitable paste is EL51-012 nickel paste from Ferro Corporation. Paste for forming external electrodes is prepared by the same method as the internal electrodes layer-forming paste.

Organic Vehicle. The organic vehicle is a binder in an organic solvent. The binder used herein is not critical; conventional binders such as ethyl cellulose, polyvinyl butanol, ethyl cellulose, and hydroxypropyl cellulose, and combinations thereof are appropriate. The organic solvent is also not critical and may be selected in accordance with a particular application method (i.e., printing or sheeting), from conventional organic solvents such as terpineol, butyl carbitol, acetone, toluene, ethanol, diethylene glycol butyl ether; 2,2,4-trimethyl pentanediol monoisobutyrate (Texanol™); alpha-terpineol; beta-terpineol; gamma terpineol; tridecyl alcohol; diethylene glycol ethyl ether (Carbitol™), diethylene glycol butyl ether (Butyl Carbitol™) and propylene glycol; and blends thereof, Products sold under the Texanol® trademark are available from Eastman Chemical Company, Kingsport, Tenn.; those sold under the Dowanol® and Carbitol® trademarks are available from Dow Chemical Co., Midland, Mich.

No particular limit is imposed on the organic vehicle content of the respective pastes (dielectric or electrode pastes). Often the paste contains about 1 to 5 wt % of the binder and about 10 to 50 wt % of the organic solvent, with the balance being either the metal component (for an electrode) or a dielectric component (for a dielectric layer). If desired, the respective pastes may contain up to about 10 wt % of other additives such as dispersants, plasticizers, dielectric compounds, and insulating compounds.

A green chip then may be prepared from the dielectric layer-forming paste and the internal electrode layer-forming paste. In the case of printing method, a green chip is prepared by alternately printing the pastes onto a substrate of a polyester film, an example of which is polyethylene terephthalate (PET), in laminar form, cutting the laminar stack to a predetermined shape and separating it from the substrate. Also useful is a sheeting method wherein a green chip is prepared by forming green sheets from the dielectric layer-forming paste, printing the internal electrode layer-forming paste on the respective green sheets, and stacking the printed green sheets. After the organic vehicle is removed from the green chip, it is fired. The organic vehicle may be removed under conventional conditions, by heating at a rate of 0.01° C. to 20° C./hour, more preferably about 0.03–0.1° C./hour, with a hold temperature of about 150° C.–300° C., more preferably about 250° C., and a hold time of about 30–700 minutes, more preferably about 200–300 minutes in an air atmosphere.

The green chip is then fired in an atmosphere, determined according to the type of conductor in the internal electrode layer-forming paste. Where the internal electrode layers are formed of a base metal conductor such as nickel and nickel alloys, the firing atmosphere may have an oxygen partial pressure of $10^{-8}$ to $10^{-12}$ atm. Sintering at a partial pressure lower than $10^{-12}$ atm should be avoided, since at such low pressures the conductor can be abnormally sintered and may become disconnected from the dielectric layers. At oxygen partial pressures above about $10^{-8}$ atm, the internal electrode layers may be oxidized.

For firing, the chip preferably is held at a temperature of from about 800° C. to about 1200° C., more preferably 900° C. to 1100° C., for about two hours to ensure that any residual organic vehicle is removed. Next, the temperature is raised to a peak temperature of from about 1100° C. to about 1400° C., more preferably from about 1200° C. to about 1300° C. The temperature is held for about two hours to enhance densification. Lower hold temperatures provide insufficient densification whereas higher hold temperatures can lead to very large grains. The firing is preferably conducted in a reducing atmosphere. An exemplary atmospheric gas is wet $N_2$, or a humidified mixture of $N_2$ and $H_2$ gases. Remaining conditions for sintering preferably are a ramp rate of about 50° C. to 500° C./hour, more preferably about 200° C. to 300° C./hour; hold temperature of about 1100° C. to about 1400° C., preferably about 1200° C. to about 1300° C., hold time: about 0.5 to about 8 hours, more preferably about 1 to 3 hours; cooling rate: 50° C. to 500° C./hour, more preferably 200° C. to 300° C./hour.

Annealing of the capacitor chip may follow firing. Annealing re-oxidizes the dielectric layers, to optimize the resistance of the ceramic to dielectric breakdown (i.e., reliability). Firing in a reducing atmosphere removes oxygen ($O_2$) from the dielectric. Re-oxidation introduces a limited amount of oxygen into the dielectric layers to compensate for oxygen vacancies inevitably formed during firing in the oxygen deficient atmosphere. These oxygen vacancies allow charge to move through the dielectric, thereby decreasing the dielectric properties of the composition. Therefore, the re-oxidation process improves insulation resistance and reliability.

The annealing atmosphere may have an oxygen partial pressure of at least $10^{-6}$ atm, preferably $10^{-5}$ to $10^{-4}$ atm. The dielectric layers are not sufficiently re-oxidized at lower oxygen partial pressures, whereas base-metal internal electrode layers are likely to be oxidized at higher oxygen partial pressures.

For annealing, the chip preferably is held at a temperature of lower than about 1200° C., more preferably about 700° C. to about 1100° C. Below about 700° C., the dielectric layers are insufficiently oxidized, thereby leading to a shorter life. Above about 1100° C., the internal electrode layers can be over-oxidized (leading to reduced capacitance) and may react with the dielectric material (leading to a shorter life). Remaining conditions for annealing preferably are as follows: hold time up to 20 hours, preferably 2 to 10 hours; cooling rate 50° C. to 500° C./hour, more preferably 100 to 300° C./hour; in an atmosphere comprising a dry mixture of nitrogen gas and air.

The organic vehicle removal, firing, and annealing may be carried out either continuously or separately. If continuous, the process includes organic vehicle removal, changing the atmosphere without cooling, raising the temperature to the firing temperature, holding at that temperature for a specified time, reducing the temperature for annealing temperature, changing the atmosphere at that temperature, and annealing. If separate, after organic vehicle removal and cooling down, the temperature of the chip is raised to the organic vehicle-removing temperature in dry or humid nitrogen gas. The atmosphere then is changed to a reducing one, and the temperature is further raised for firing. Thereafter, the temperature is reduced to the annealing temperature and the atmosphere is again changed to dry or humid nitrogen gas, and cooling is continued. Alternately, once cooled down, the temperature may be raised to the annealing temperature in a nitrogen gas atmosphere. The entire annealing step may be done in a humid nitrogen gas atmosphere.

The resulting chip may be polished at end faces by barrel tumbling and sand blasting, for example, before the external electrode-forming paste is printed or transferred and baked to form external electrodes (terminations). Firing of the external electrode-forming paste may be carried out in a dry nitrogen atmosphere (about $10^{-6}$ atm $pO_2$ partial pressure), at about 600° C. to 800° C., for about 10 minutes to about 1 hour.

If necessary, pads are formed on the external electrodes by plating or other methods known in the art. The multilayer ceramic chip capacitors of the invention can be mounted on printed circuit boards, for example, by soldering.

The following examples are provided to illustrate preferred aspects of the invention and are not intended to limit the scope of the invention.

EXAMPLE 1

A dielectric composition identified as Example 1 was formed by mixing, blending, and/or milling in water appropriate amounts of $BaTiO_3$ (pre-reacted), $BaZrO_3$ (pre-re- acted), Ba(Zn$_{1/3}$Nb$_{2/3}$)O$_3$ (pre-reacted), MgO, Nd$_2$O$_3$, MnO$_2$, Y$_2$O$_3$, and sintering frit that consist of BaO, CaO, TiO$_2$, and SiO$_2$ (pre-reacted) to arrive at the weight percentage shown in Table 3.

TABLE 3

Oxide ingredients of Example 1.

| Pre-reacted ingredients | actual ingredient wt % | Simple oxide equivalent ingredients | Wt % |
|---|---|---|---|
| BaTiO$_3$ | 84.74 | BaO | 63.56 |
| BaZrO$_3$ | 12.62 | TiO$_2$ | 29.24 |
| Ba(Zn$_{1/3}$Nb$_{2/3}$)O$_3$ | 0.23 | ZrO$_2$ | 5.65 |
| MgO | 0.07 | ZnO | 0.02 |
| Nd$_2$O$_3$ | 0.59 | MgO | 0.07 |
| MnO$_2$ | 0.29 | Nb$_2$O$_5$ | 0.08 |
| CaTiO$_3$ (frit) | 0.12 | MnO$_2$ | 0.29 |
| BaO (frit) | 0.43 | Nd$_2$O$_3$ | 0.59 |
| SiO$_2$ (frit) | 0.05 | Y$_2$O$_3$ | 0.40 |
|  |  | CaO | 0.05 |
|  |  | SiO$_2$ | 0.05 |

Alternatively, the composition of Example 1 can be represented by the following formula:

$(Ba_{0.9853}Ca_{0.0021}Y_{0.0042}Nd_{0.0084})_{1.0001}$
$(Ti_{0.8705}Zr_{0.1091}$
$Zn_{0.0007}Mg_{0.0042}Nb_{0.0042}Mn_{0.008}Y_{0.0042}Si_{0.002})$
$O_{3.0579}$

The powders had an average particle size of 0.5 to 1 μm. One hundred grams of the above powders was then added to 28.8 grams of an organic vehicle comprising polyvinyl butanol, toluene, and ethanol, and wet milled for 24 hours to prepare a slurry for tape casting. The wet slurry was coated on a polyester film to form dielectric green tapes. The thickness of the dielectric green tapes was from about 5 to about 15 microns depending on the specific testing to be performed on them. Nickel electrodes were printed onto the dried green dielectric tape by conventional screen-printing methods using EL51-012 nickel paste from Ferro Corporation of Cleveland, Ohio. A total of 10 sheets were stacked and bonded under a pressure of 5100 psi [~347 atmospheres] and a temperature of 130° F. to form a green chip. After dicing to a suitable dimension so that, after sintering and shrinkage, (which is typically from 15% to 20% in both X and Y directions), the chip dimension is about 0.12"(L)× 0.06"(W) (EIA1206 size) or 0.08"(L)×0.05" (W) (EIA0805 size), the green chip was heated to remove the organic vehicle and then was fired and re-oxidized in a Tokai Konetsu Kyogo batch kiln under the following process conditions to obtain a multilayer capacitor chip:

TABLE 4

Vehicle removal, firing and re-oxidation conditions.

|  | Vehicle Removal | Firing | Peak Firing | Re-oxidation |
|---|---|---|---|---|
| Ramp Rate | — | +3.3° C./min | +3.3° C./min | — |
| Ramp Time | 48 hours | — | — | — |
| Hold Temp | 250° C. | 1000° C. | 1275° C. | 1000° C. |
| Hold Time | 200 min | 2 hours | 2 hours | 3 hours |
| Cool Rate | n/a | n/a | −5° C./min | −2° C./min |
| Atmosphere | Air (1 atm) | 10$^{−10}$ atm pO$_2$ | 10$^{−10}$ atm pO$_2$ | 6 × 10$^{−6}$ atm pO$_2$ |

To humidify the atmospheric gases, a wetter was used with a water temperature of 35° C. The chip thus obtained was corner rounded by tumbling. An external electrode forming copper paste available as TM50-081 from Ferro Corporation of Cleveland, Ohio was applied to the end faces and fired in a dry nitrogen atmosphere at 775° C. for about 70 minutes to form external electrodes. The multilayer capacitor thus processed had dimensions of about 3.2 mm×1.6 mm (EIA 1206 size) or about 2.1 mm×1.3 mm (EIA0805 size) with variable thickness. The dielectric layers were 7.0 microns thick, and the internal nickel electrode layers were about 1.5 microns thick. The electrical properties of the dielectric were measured by the standard procedures outlined in the EIA specifications as presented in Table 7.

EXAMPLE 2

A dielectric composition was formed by the following procedure. BaCO$_3$, TiO$_2$, ZrO$_2$, Nd$_2$O$_3$.2H$_2$O, ZnO, Nb$_2$O$_5$, MnCO$_3$, Y$_2$O$_3$ powders were mixed together with water, and milled as a slurry according to the proportions of "actual ingredients" in Table 5. After thoroughly blending, mixing and milling in water, the slurry was then belt dried. The method of drying is not critical, and other conventional drying processes such as pan drying, belt drying, or freeze drying are believed to be effective.

The dried powder mix was then calcined through a batch kiln at 1100° C. for 4 hours to form a precursor powder. To 99.62 wt % of the precursor powder, 0.38 wt % of a BaO—CaTiO$_3$—SiO$_2$ sintering flux was added. The final precursor powder composition can be expressed as "simple oxide ingredients" in Table 5.

TABLE 5

Oxide ingredients of Example 2.

| Pre-reacted actual ingredients | actual ingredient wt % | Simple oxide equivalent composition Ingredients | Wt % |
|---|---|---|---|
| BaCO$_3$ | 68.49 | BaO | 62.91 |
| TiO$_2$ | 24.89 | TiO$_2$ | 29.47 |
| ZrO$_2$ | 4.64 | ZrO$_2$ | 5.48 |
| Nd$_2$O$_3$.2H$_2$O | 0.58 | ZnO | 0.45 |
| ZnO | 0.38 | MgO | 0.08 |
| Nb$_2$O$_5$ | 0.07 | Nb$_2$O$_5$ | 0.08 |
| MnCO$_3$ | 0.38 | MnO$_2$ | 0.39 |
| Y$_2$O$_3$ | 0.43 | Nd$_2$O$_3$ | 0.51 |
| MgCO$_3$ | 0.14 | Y$_2$O$_3$ | 0.51 |
|  |  | CaO | 0.06 |
|  |  | SiO$_2$ | 0.06 |

Alternatively, the composition of Example 2 can be represented by the following formula:

$(Ba_{0.9848}Ca_{0.0026}Y_{0.0054}Nd_{0.0072})_{0.973}$
$(Ti_{0.8615}Zr_{0.1038}Zn_{0.0129}Mg_{0.0046}Nb_{0.0014}$
$Mn_{0.0105}Y_{0.0052}Si_{0.0023})O_{2.9641}.$

Following the same procedure as described in Example 1, multilayer chip capacitors were made from the powder and tested. The electrical properties are summarized in Table 7, below.

EXAMPLE 3

A dielectric composition was prepared in the manner of Example 2 except that no ZnO was used. The final composition can be expressed as in Table 6.

Examples 1, 2, and 3, each have a very high dielectric constant, low DF, low aging rate, small fired grain size, and high breakdown voltage. The TCC meets the Y5V standard and the RC at 25° C. and 85° C. both exceed EIA specifications. The characteristic life of samples lasted up to 100 hours tested at highly accelerated (HALT) conditions at 140° C. and an electric field strength of 20 V/μm (Example 1) and 15 V/μm (Examples 2 and 3).

TABLE 7

Electrical properties and life testing for Examples 1–3.

|  | Example 1 | Example 2 | Example 3 |
|---|---|---|---|
| Firing (° C., $PO_2$ (atm)) | 1275, $10^{-10}$ | 1225, $10^{-10}$ | 1250, $10^{-10}$ |
| Capacitance (nF) | 580 | 797 | 392 |
| DF (%) | 6.33 | 4.03 | 5.74 |
| Calculated K | 19,870 | 17,000 | 15,691 |
| $T_C$ (%) |  |  |  |
| −30° C. | −38.6 | −40.6 | −17.6 |
| −10° C. | −12.3 | −10.0 | 10.6 |
| 0° C. | 6.0 | 3.6 | 16.9 |
| 10° C. | 16.0 | 15.2 | 16.0 |
| 25° C. | 0.00 | 0.0 | 0.0 |
| 30° C. | −10.4 | −7.3 | −9.0 |
| 40° C. | −29.6 | −24.0 | −24.0 |
| 55° C. | 53.16 | −50.0 | −61.5 |
| 85° C. | 77.56 | −71.9 | −71.8 |
| TCC maximum, (%) | 16.0 | 15.2 | 17.5 |
| Curie Point, (° C.) | 10 | 10 | 5 |
| RC (sec.) at 25° C. | 196,213 | 747,590 | 766,500 |
| RC(sec.) at 85° C. | 14,315 | 18,500 | 87,620 |
| Breakdown Voltage (V/μm) | 31 | 42 | 53 |
| Aging (% per decade) | 4.3 |  |  |
| HALT (@140° C.)(hours) | 43 hr @ 20 V/μm | 100 hr @ 15 V/μm | 100 hr @ 15 V/μm |

TABLE 6

Oxide ingredients of Example 3.

| Pre-reacted actual ingredients | actual ingredient wt % | Simple oxide equivalent composition ingredients | Wt % |
|---|---|---|---|
| $BaTiO_3$ | 86.21 |  |  |
| BaO | 6.52 | BaO | 63.20 |
| $TiO_2$ | 0.08 | $TiO_2$ | 26.91 |
| $ZrO_2$ | 5.50 | $ZrO_2$ | 5.50 |
| MgO | 0.08 | MgO | 0.08 |
| $Nb_2O_5$ | 0.08 | $Nb_2O_5$ | 0.08 |
| $MnO_2$ | 0.39 | $MnO_2$ | 0.39 |
| $Nd_2O_3$ | 0.51 | $Nd_2O_3$ | 0.51 |
| $Y_2O_3$ | 0.51 | $Y_2O_3$ | 0.51 |
| CaO | 0.06 | CaO | 0.06 |
| $SiO_2$ | 0.06 | $SiO_2$ | 0.06 |

Alternately, the composition of Example 3 can be represented by the following formula:

$(Ba_{0.9894}Ca_{0.0026}Y_{0.0054}Nd_{0.0072})_{0.971}$
$(Ti_{0.8709}Zr_{0.1049}Mg_{0.0047}Nb_{0.0014}Mn_{0.0105}Y_{0.0053}Si_{0.0023})O_{2.9707}$.

Following the procedure of Example 1, multilayer chip capacitors were made from the powder of Example 3 and tested. The electrical properties are summarized in Table 7. The exemplary chips made from the compositions of

EXAMPLES 4–18

Dielectric compositions were prepared in the manner described in Example 2 except that the A/B molar ratio, herein more precisely expressed as the molar ratio of BaO/($TiO_2$+ZrO2), was adjusted by (1) varying the amounts of $TiO_2$ and/or $ZrO_2$ ratio in the precursor powder or (2) adding additional $BaCO_3$ when the precursor powder is added with flux or (3) adding additional $ZrO_2$ when the precursor powder is added with flux or (4) adding additional $TiO_2$ when the precursor powder is added with flux. It will be appreciated that using any precursor containing barium, titanium or zirconium (e.e.g., $Ba(OH)_2$, $Ti(OH)_4$, or $Zr(OH)_2$) serves the same purpose. Table 8 presents exemplary compositions of the Examples 4–18.

Powders identified as examples 4 to 18 were added to a polyvinyl alcohol (PVA) based vehicle, and pressed at 1000 KPa in a 10 mm diameter stainless steel die to form green discs. The green discs were sintered under the conditions of Example 2, and the density of the discs was calculated. Green discs were also painted with a Ni electrode paste and sintered at the same conditions. The discs were measured for DF and TCC, and dielectric constant was calculated. The results are shown in Table 8, below.

TABLE 8

Compositions of Examples 4–18, density, dielectric properties.

| Ex | A/B, original | A/B, final | Adjustment Method | Density (g/cc) | K | DF (%) | $T_{Curie}$ (° C.) | $TCC_{max}$ (%) |
|---|---|---|---|---|---|---|---|---|
| 4  | 0.995 | 0.995 | $BaCO_3$ addition | 5.93 | 15078 | 0.29 |  6.6  | 30 |
| 5  | 0.995 | 0.997 | $BaCO_3$ addition | 5.92 | 12722 | 0.35 |  2.2  | 34 |
| 6  | 0.995 | 1.000 | $BaCO_3$ addition | 5.96 | 10695 | 0.20 | −5.9  | 48 |
| 7  | 0.995 | 1.002 | $BaCO_3$ addition | 5.97 |  9340 | 0.17 | −12.3 | 65 |
| 8  | 0.995 | 1.002 | $BaCO_3$ addition | 5.98 |  8026 | 0.21 | −17.1 | 72 |
| 9  | 1.006 | 0.998 | $TiO_2$ addition  | 5.95 | 10436 | 0.33 | −6.4  | 44 |
| 10 | 1.006 | 1.000 | $TiO_2$ addition  | 5.97 |  9511 | 0.38 | −11.0 | 56 |
| 11 | 1.006 | 1.002 | $TiO_2$ addition  | 6.00 |  8007 | 0.33 | −15.2 | 63 |
| 12 | 1.006 | 1.004 | $TiO_2$ addition  | 6.00 |  6256 | 0.27 | −21.8 | 64 |
| 13 | 1.006 | 1.006 | $TiO_2$ addition  | 5.95 |  5013 | 0.30 | −26.7 | 65 |
| 14 | 1.002 | 1.002 | $TiO_2/ZrO_2$ variation | 5.99 | 8468 | 0.18 | −14.7 | 62 |
| 15 | 1.003 | 1.003 | $TiO_2/ZrO_2$ variation | 5.99 | 9505 | 0.39 | −4.4  | 40 |
| 16 | 1.000 | 1.000 | $ZrO_2$ addition  | 5.96 | 10695 | 0.20 | −5.9  | 48 |
| 17 | 1.002 | 1.001 | $ZrO_2$ addition  | 5.95 | 10099 | 0.20 | −8.7  | 55 |
| 18 | 1.004 | 1.001 | $ZrO_2$ addition  | 5.96 | 10102 | 0.16 | −10.4 | 58 |

Table 8 shows that when A/B is between 0.995 and 1.003, the dielectric compositions of this invention have desired high K, low DF, and high density. The Curie temperature ($T_{Curie}$) and maximum TCC ($TCC_{max}$) each vary according to the A/B ratio. It will be appreciated that this variation can be compensated for by processing or electrode paste adjustment when powders are made into multilayer chip capacitors. When A/B is higher than 1.003 such as Example 12 and Example 13, K becomes too low because the Curie temperature is too low.

EXAMPLES 19–29

Dielectric compositions were prepared in the manner of Example 2 except that the additives of $MnO_2$, $Nd_2O_3$, $Nb_2O_5$, $Y_2O_3$, and MgO+ZnO were varied in the precursor powders as shown in the left side of Table 9. BaO and $TiO_2$, which make account for the remainder of the compositions, each totaling 100% by weight. The right side of Table 9 presents density and dielectric properties of the dielectric compositions.

Table 9 shows that within the indicated ranges of variations of $MnO_2$, MgO+ZnO, $Nd_2O_3$, $Nb_2O_5$, and $Y_2O_3$, the dielectric compositions of this invention all exhibit high K, low DF, and high density.

EXAMPLES 30–34

Dielectric compositions were prepared according to Example 2 except that the flux additives were varied. Following the procedures for Examples 4–18, exemplary powders 30–34 were made into ceramic discs, sintered, and their sintered densities and dielectric properties were measured. The variation in flux amounts and measured properties are shown in Table 10.

TABLE 9

Examples 19–29, compositions, density and dielectric properties.

| | Compositions | | | | | Properties | | | | |
|---|---|---|---|---|---|---|---|---|---|---|
| Ex | $MnO_2$ | MgO + ZnO | $Nd_2O_3$ | $Nb_2O_5$ | $Y_2O_3$ | Remark | Density (g/cc) | K | DF (%) | $T_{Curie}$ (° C.) | TCC max (%) |
| 19 | 0.46 | 0.87 | 0.41 | 0.07 | 0.54 | Control          | 5.97 | 11598 | 0.34 | −2.0  | 39 |
| 20 | 0.56 | 0.87 | 0.41 | 0.07 | 0.54 | +20% $MnO_2$     | 5.96 |  9430 | 0.36 | −10.8 | 54 |
| 21 | 0.37 | 0.87 | 0.41 | 0.07 | 0.54 | −20% $MnO_2$     | 5.98 | 14401 | 0.41 |  8.6  | 22 |
| 22 | 0.46 | 1.05 | 0.41 | 0.07 | 0.54 | +20% (MgO + ZnO) | 5.96 | 10293 | 0.33 | −6.6  | 50 |
| 23 | 0.46 | 0.70 | 0.41 | 0.07 | 0.54 | −20% (MgO + ZnO) | 5.97 | 12940 | 0.36 |  4.0  | 31 |
| 24 | 0.46 | 0.87 | 0.50 | 0.07 | 0.54 | +20% $Nd_2O_3$   | 5.98 | 10776 | 0.32 | −4.5  | 45 |
| 25 | 0.46 | 0.87 | 0.33 | 0.07 | 0.54 | −20% $Nd_2O_3$   | 5.96 | 12027 | 0.33 | −0.2  | 35 |
| 26 | 0.46 | 0.87 | 0.41 | 0.08 | 0.54 | +20% $Nb_2O_5$   | 5.97 | 12054 | 0.36 |  0.1  | 37 |
| 27 | 0.46 | 0.87 | 0.41 | 0.06 | 0.54 | −20% $Nb_2O_5$   | 5.98 | 11298 | 0.32 | −2.0  | 41 |
| 28 | 0.46 | 0.87 | 0.41 | 0.07 | 0.64 | +20% $Y_2O_3$    | 5.98 | 10059 | 0.31 | −6.5  | 47 |
| 29 | 0.46 | 0.87 | 0.41 | 0.07 | 0.43 | −20% $Y_2O_3$    | 5.95 | 12118 | 0.37 |  3.8  | 27 |

TABLE 10

Variation of dielectric properties with flux content.

| Example | Flux (wt %) | Density (g/cc) | K | DF (%) | TCurie (° C.) | TCmax (%) |
|---|---|---|---|---|---|---|
| 30 | 0.10 | 6.00 | 8220 | 0.37 | −15.2 | 63 |
| 31 | 0.19 | 6.00 | 8091 | 0.30 | −15.1 | 63 |
| 32 | 0.29 | 6.00 | 8010 | 0.29 | −14.9 | 60 |
| 33 | 0.38 | 6.00 | 8246 | 0.29 | −15.2 | 62 |
| 34 | 0.57 | 5.98 | 8030 | 0.29 | −13.1 | 53 |

Table 10 shows that within the range of flux from 0.10% to 0.57%, the sintered dielectric articles exhibit high K, low DF, and high density.

The dielectric composition identified as Example 2 was formed into green chips, fired at either 1225° C. or 1250° C. and in the range of oxygen partial pressure of $10^{-11}$ to $10^{-9}$ atmospheres. FIGS. 2 to 5 illustrate the dielectric properties of thus formed sintered chips as a function of firing temperature and atmosphere.

Figure 2:
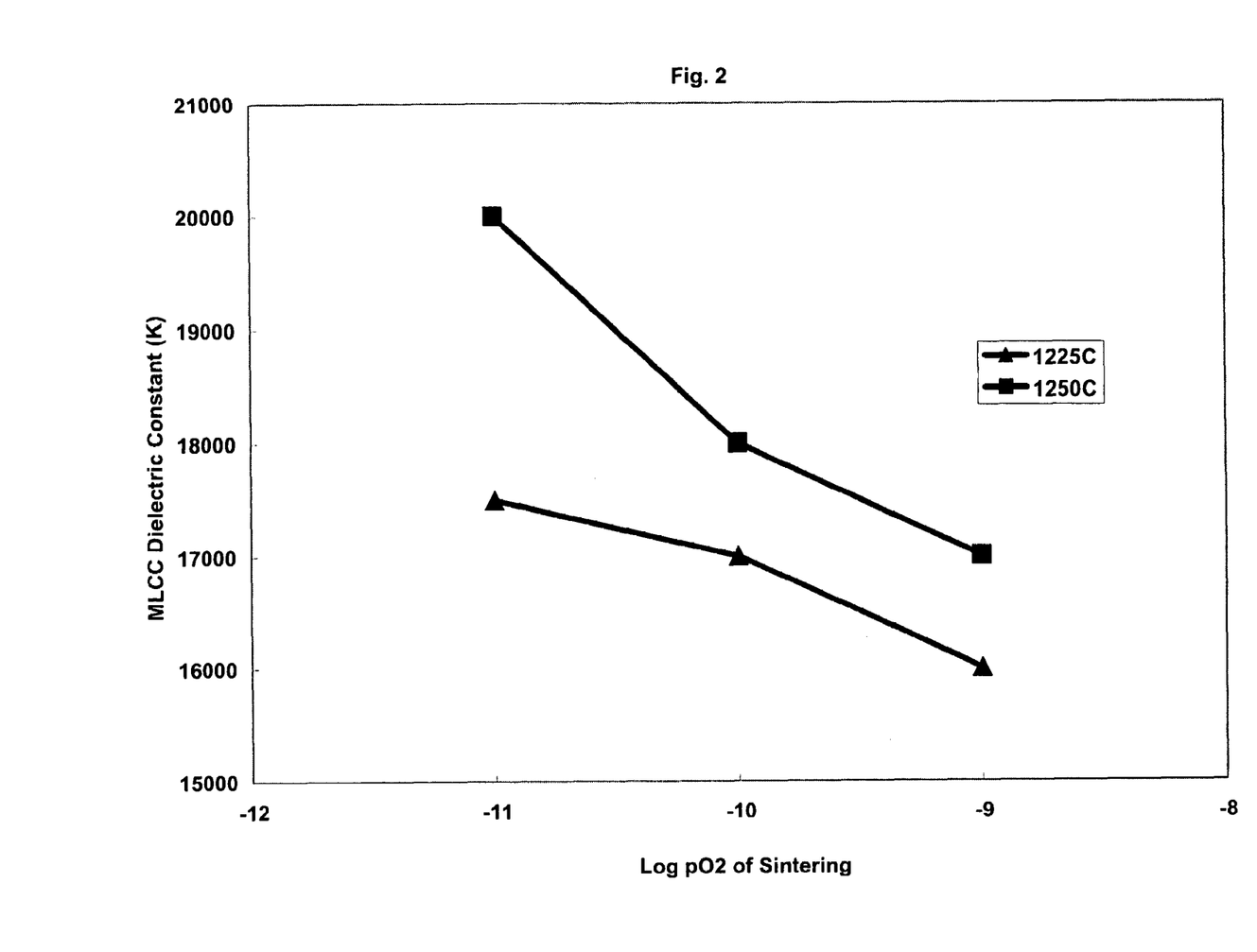
FIG. 2 is a graph showing the dielectric constant of a dielectric composition in accordance with the invention as a function of firing conditions.
Figure 3:
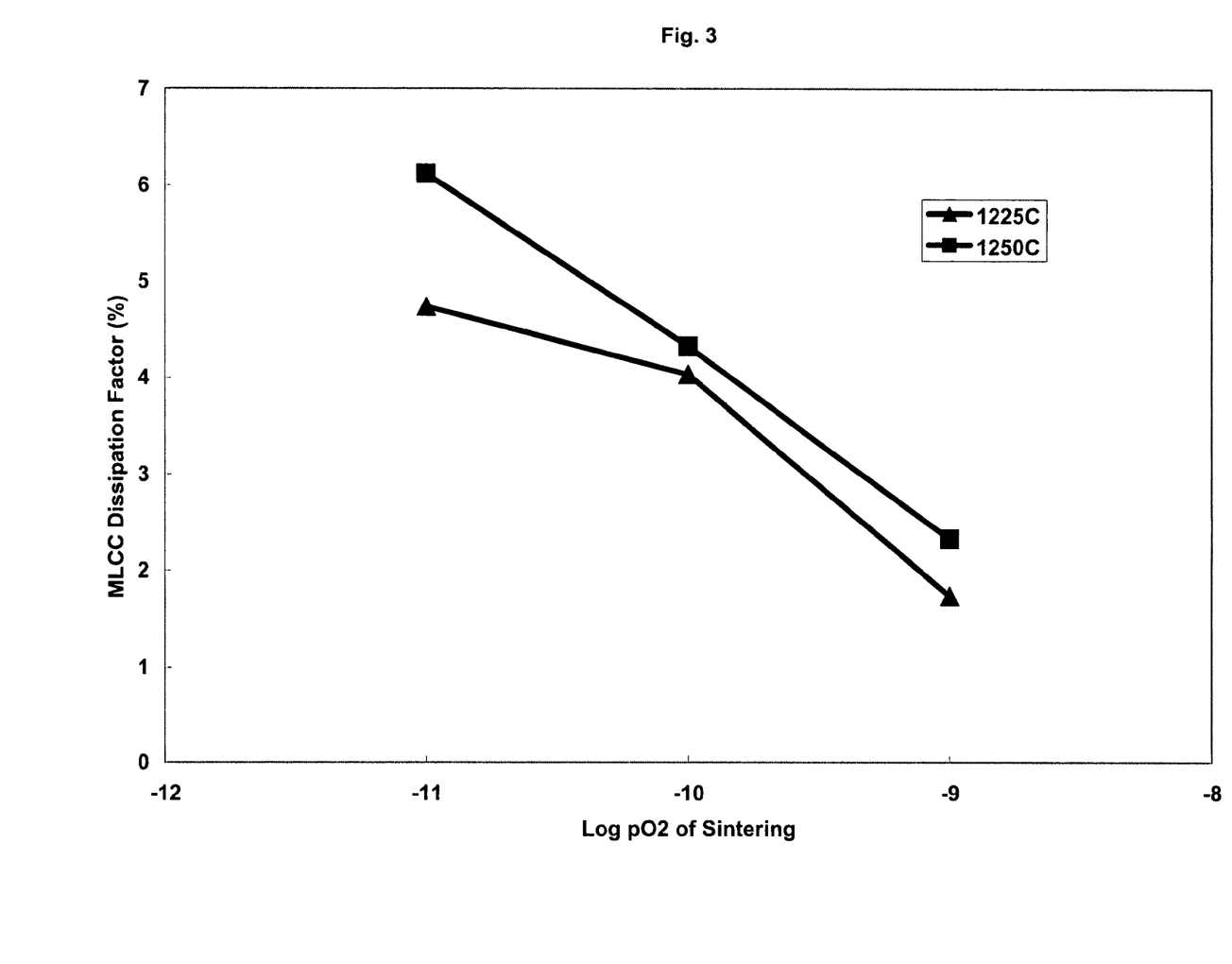
FIG. 3 is a graph showing the dissipation factor of a dielectric composition in accordance with the invention as a function of firing conditions.
Figure 4:
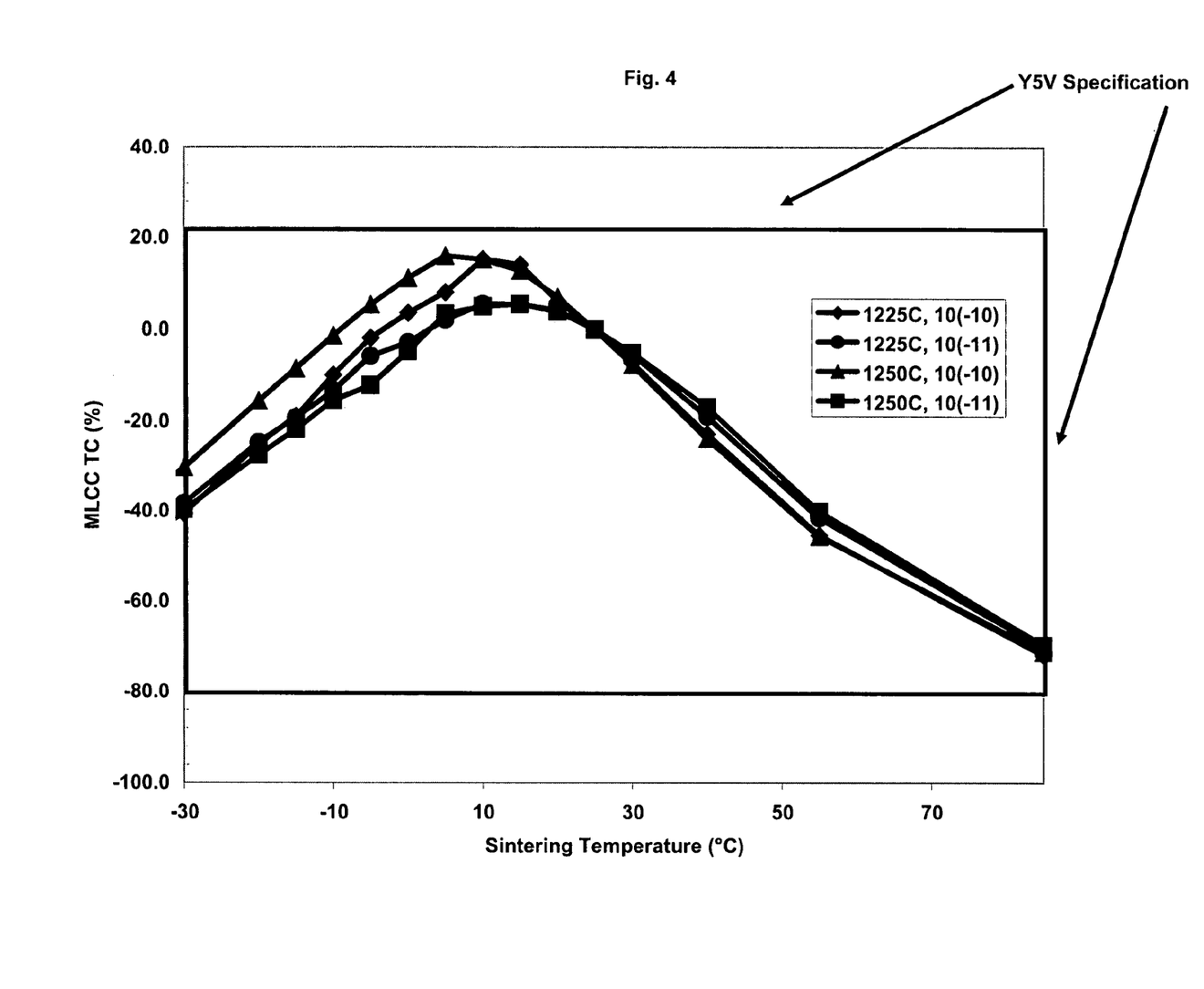
FIG. 4 is a graph showing the TCC of a dielectric composition in accordance with the invention as a function of firing conditions.
Figure 5:
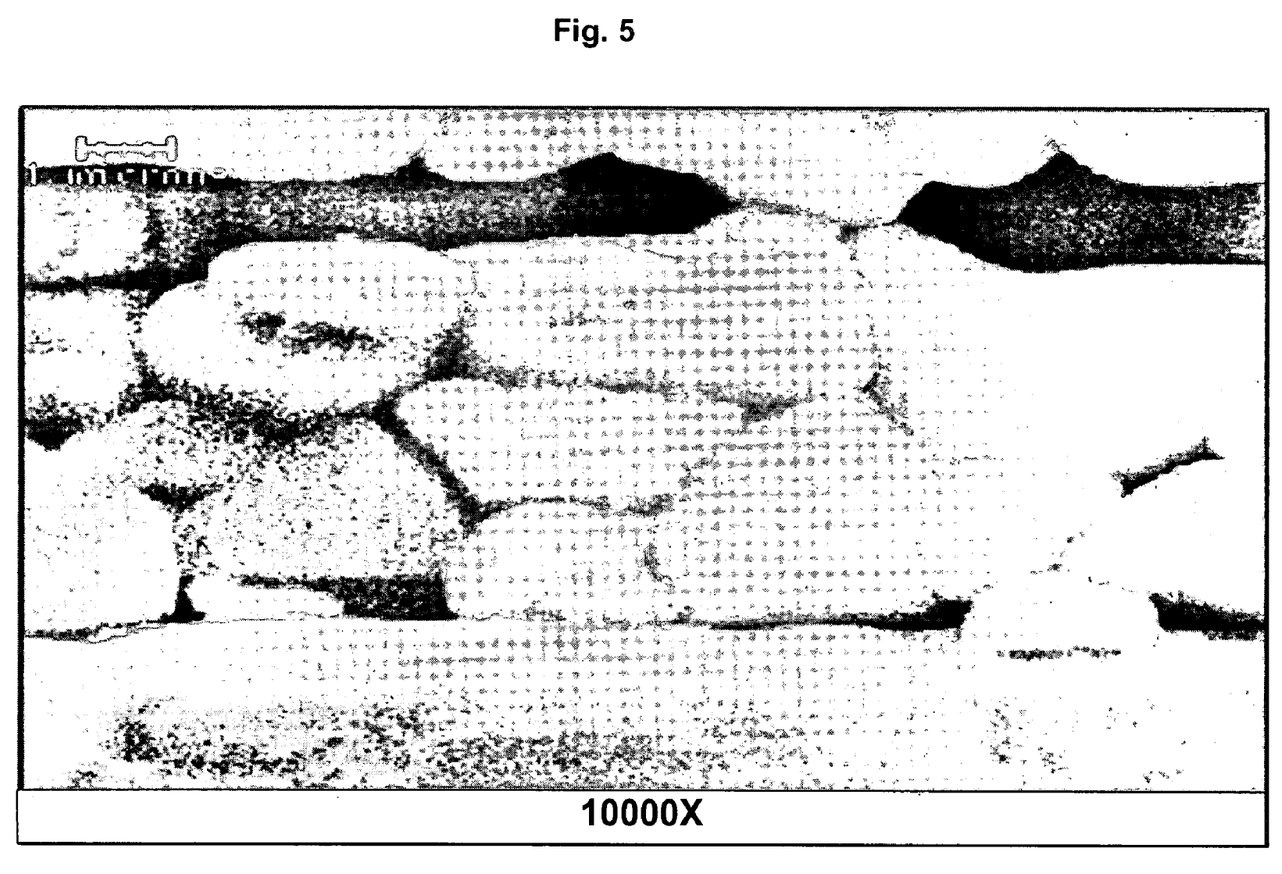
FIG. 5 is a graph showing typical fired grain size of a dielectric composition in accordance with the invention.

FIG. 2 indicates that the dielectric constant remains higher than 16000 in the firing range 1225–1250° C. and oxygen partial pressure range of $10^{-11}$ to $10^{-9}$ atmospheres. The dissipation factor remains below 6.5% when fired at 1225° C. to 1250° C. and oxygen partial pressures from $10^{-11}$ to $10^{-9}$ atmospheres, as shown in FIG. 3. FIG. 4 illustrates the TCC characteristics of chips formed from the dielectric composition of Example 2 as a function of firing temperature (1225° C. or 1250° C.) and oxygen partial pressure ($10^{-11}$ or $10^{-10}$ atmospheres). Very stable TCC characteristics meeting Y5V specifications are indicated. The capacitance change remains within the range of +22% to −82% of the value at 25° C. between −30° C. and +85° C. in the firing range 1225° C.–1250° C. and in the range of oxygen partial pressures from $10^{-11}$ to $10^{-10}$ atmospheres. FIG. 5 illustrates a typical microstructure (at 10,000× magnification) of a multilayer capacitor made from a dielectric composition of this invention. It shows very uniform and small fired grain size between 3 to 4 microns. The grain size, electrical properties, fine microstructure, and a wide range of processability indicate that the dielectric composition of the invention is suitable for high capacitance multilayer capacitor applications with a dielectric thickness less than 3 microns and more than 300 active layers.

Additional advantages and modifications will readily occur to those skilled in the art. Therefore, the invention in its broader aspects is not limited to the specific details and illustrative example shown and described herein. Accordingly, various modifications may be made without departing from the spirit or scope of the general invention concept as defined by the appended claims and their equivalents.

What is claimed is:

1. A method of forming an electronic component comprising: applying particles of a dielectric material to a substrate and firing the substrate at a temperature sufficient to sinter the dielectric material, wherein the dielectric material comprises a blend (in weight percent) of

| | Component | | | | | |
|---|---|---|---|---|---|---|
| | BaO | TiO$_2$ | MgO | CaO | ZnO | MnO$_2$ |
| Wt % | 52–70 | 25–33 | 0.02–1.5 | 0.01–1.5 | 0–1.5 | 0.02–1.5 |
| | Component | | | | | |
| | ZrO$_2$ | SiO$_2$ | Nd$_2$O$_3$ | Nb$_2$O$_5$ | Y$_2$O$_3$ | |
| Wt % | 2–12 | 0.01–2.5 | 0.02–2.5 | 0.02–2.5 | 0.02–2.5. | |

2. The method of claim 1 wherein the firing is conducted at a temperature of 1100–1400° C.

3. The method of claim 1 wherein the firing is conducted at a temperature of 1200–1300° C.

4. The method of claim 1 wherein the firing is conducted at a temperature of 1225–1275° C.

5. The method of claim 1 wherein the dielectric material has a dielectric constant of 14000–20000.

6. The method of claim 1 wherein the dielectric material has a dielectric constant of 15000–19000.

7. The method of claim 1 wherein the electronic component has a dielectric constant of at least about 8000.

8. A method of forming an electronic component comprising: applying particles of a dielectric material to a substrate and firing the substrate at a temperature sufficient to sinter the dielectric material, wherein the dielectric material comprises:

| | Component | | | | | | | | | | |
|---|---|---|---|---|---|---|---|---|---|---|---|
| | BaO | TiO$_2$ | MgO | CaO | ZnO | MnO$_2$ | ZrO$_2$ | SiO$_2$ | Nd$_2$O$_3$ | Nb$_2$O$_5$ | Y$_2$O$_3$ |
| Wt % | 58–67 | 28–31 | 0.06–0.12 | 0.01–0.07 | 0.01–0.80 | 0.10–0.70 | 3–8 | 0.01–0.10 | 0.20–0.80 | 0.04–0.12 | 0.20–1. |

9. A method of forming an electronic component comprising: applying particles of a dielectric material to a substrate and firing the substrate at a temperature sufficient to sinter the dielectric material, wherein the dielectric material comprises:

10. A method of forming an electronic component comprising:
   a. applying to a first substrate a green dielectric composition to form a green tape layer, the green dielectric composition comprising an oxide component and an organic vehicle,
   b. applying to the green tape a green paste comprising a base metal to form an internal electrode layer,
   c. repeating steps a and b until a desired number of layers is obtained to form a stack heating the stack to remove the organic vehicle,
   d. firing the stack to sinter the metal in the internal electrode and fuse the oxides in the dielectric material, wherein the internal electrode and the dielectric material each have a thickness,
   e. wherein the oxide component comprises

| Component | | | | | | | | | | |
|---|---|---|---|---|---|---|---|---|---|---|
| BaO | TiO$_2$ | MgO | CaO | ZnO | MnO$_2$ | ZrO$_2$ | SiO$_2$ | Nd$_2$O$_3$ | Nb$_2$O$_5$ | Y$_2$O$_3$ |
| Wt % 52–70 | 25–33 | 0.02–1.5 | 0.01–1.5 | 0–1.5 | 0.02–1.5 | 2–12 | 0.01–2.5 | 0.02–2.5 | 0.02–2.5 | 0.02–2.5. |

11. The method of claim 10 wherein the dielectric material has a dielectric constant of 14000 to 20000.

12. The method of claim 10 wherein the electronic component, after firing, has a dielectric constant of at least about 8000.

13. The method of claim 10 wherein the dielectric material, after firing, has a thickness of about 1 μm to about 10 μm.

14. The method of claim 10 wherein the firing is conducted at a temperature of 1225° C. to about 1250° C.

15. The method of claim 10 wherein the oxide component comprises

| Component | | | | | | | | | | |
|---|---|---|---|---|---|---|---|---|---|---|
| BaO | TiO$_2$ | MgO | CaO | ZnO | MnO$_2$ | ZrO$_2$ | SiO$_2$ | Nd$_2$O$_3$ | Nb$_2$O$_5$ | Y$_2$O$_3$ |
| Wt % 58–64 | 29–30 | 0.07–0.1 | 0.02–0.05 | 0.1–0.5 | 0.2–0.5 | 4–7 | 0.02–0.08 | 0.3–0.7 | 0.05–0.1 | 0.4–0.7. |

16. A multilayer ceramic chip capacitor comprising alternately stacked layers of a dielectric material and an internal electrode material comprising a transition metal other than Ag, Au, Pd, or Pt, the dielectric material comprising a sintered blend of

| Component | | | | | |
|---|---|---|---|---|---|
| BaO | TiO$_2$ | MgO | CaO | ZnO | MnO$_2$ |
| Wt % 52–70 | 25–33 | 0.02–1.5 | 0.01–1.5 | 0–1.5 | 0.02–1.5 |

| Component | | | | | |
|---|---|---|---|---|---|
| ZrO$_2$ | SiO$_2$ | Nd$_2$O$_3$ | Nb$_2$O$_5$ | Y$_2$O$_3$ | |
| Wt % 2–12 | 0.01–2.5 | 0.02–2.5 | 0.02–2.5 | 0.02–2.5. | |

17. The multilayer ceramic chip capacitor of claim 16 where the internal electrode material comprises an alloy containing nickel.

18. The multilayer ceramic chip capacitor of claim 16 where the dielectric material maintains a dielectric constant of from about 14000 to 20000.

19. The multilayer ceramic chip capacitor of claim 16 wherein the dielectric material comprises a sintered blend of

| Component | | | | | | | | | | |
|---|---|---|---|---|---|---|---|---|---|---|
| BaO | TiO$_2$ | MgO | CaO | ZnO | MnO$_2$ | ZrO$_2$ | SiO$_2$ | Nd$_2$O$_3$ | Nb$_2$O$_5$ | Y$_2$O$_3$ |
| Wt % 58–64 | 29–30 | 0.07–0.1 | 0.02–0.05 | 0.1–0.5 | 0.2–0.5 | 4–7 | 0.02–0.08 | 0.3–0.7 | 0.05–0.1 | 0.4–0.7. |

|  | Component | | | | | | | | | | |
|---|---|---|---|---|---|---|---|---|---|---|---|
|  | BaO | TiO$_2$ | MgO | CaO | ZnO | MnO$_2$ | ZrO$_2$ | SiO$_2$ | Nd$_2$O$_3$ | Nb$_2$O$_5$ | Y$_2$O$_3$ |
| Wt % | 58–64 | 29–30 | 0.07–0.1 | 0.02–0.05 | 0.1–0.5 | 0.2–0.5 | 4–7 | 0.02–0.08 | 0.3–0.7 | 0.05–0.1 | 0.4–0.7. |

20. A multilayer ceramic chip capacitor comprising a dielectric material having the formula $(Ba_{0.9894}Ca_{0.0026}Y_{0.0054}Nd_{0.0072})_{0.971}$
$(Ti_{0.8709}Zr_{0.1049}Mg_{0.0047}Nb_{0.0014}Mn_{0.0105}Y_{0.0053}Si_{0.0023})O_{2.9797}$.

* * * * *